United States Patent [19]

Downum et al.

[11] Patent Number: 5,013,149
[45] Date of Patent: May 7, 1991

[54] OVERHEAD PROJECTION HIGHLIGHTING DEVICE AND METHOD OF USE

[76] Inventors: Daniel L. Downum, 104 Abrozo Ct., Folsom, Calif. 95630; Robert L. LaFond, 436 S. Manengo, Apt. 104, Pasadena, Calif. 91101

[21] Appl. No.: 360,352

[22] Filed: Jun. 2, 1989

[51] Int. Cl.⁵ ............................................. G03B 21/64
[52] U.S. Cl. ........................... 353/122; 353/DIG. 5; 353/121; 353/42
[58] Field of Search ..................... 353/42, DIG. 5, 30, 353/35, 36, 37, 28, 122, 121; 33/489, 493, 484

[56] References Cited
U.S. PATENT DOCUMENTS

| | | | |
|---|---|---|---|
| 2,593,914 | 4/1952 | Palitto | 33/482 |
| 2,841,888 | 7/1958 | Grimmer | 353/DIG. 5 X |
| 3,342,101 | 9/1967 | Zollner | 353/44 |
| 3,912,360 | 10/1975 | Beckel | 350/534 |
| 3,998,535 | 12/1976 | Clarke | 353/DIG. 5 X |
| 4,632,529 | 12/1986 | Levin | 33/430 X |

*Primary Examiner*—Harry N. Haroian
*Attorney, Agent, or Firm*—James M. Ritchey

[57] ABSTRACT

A highlighting device and method of use for focusing audience attention on an overhead projection is disclosed whereby a generally flat color tinted and light transmissive body having upper and lower surfaces with an optional handle and feet is employed as a register/highlighter for aligning and emphasizing an information transparency sheet.

8 Claims, 4 Drawing Sheets

OVERHEAD PROJECTION HIGHLIGHTING DEVICE AND METHOD OF USE

BACKGROUND OF THE INVENTION

1. Field of the Invention

This invention relates to overhead projectors, specifically to methods and accessories that are used with overhead projectors to color highlight and align projected transparency images as a means to capture and guide audience attention.

2. Description of the Background Art

Many presenters depend upon overhead projection as a primary communications media particularly in business, industry and education. Transparency costs are low and preparation is quick and easy. The pervasive method of transparency preparation is simply to xerographically copy the originals onto standard-size monochrome transparencies. The majority of presentations consist of a series of unmodified, unmounted, unbound single sheets. It is a nearly universal practice to project this series without the aid of any accessory to highlight or align image areas. Because of the convenience and economy, this presentation approach endures in spite of major shortcomings including: (1) loss of attention from ineffective means to highlight image areas and points of interest to pace audience focus; (2) low visual interest inherent in strictly black and white transparencies; and (3) distraction from transparency misalignment.

The prior art shows very few accessories to manipulate the highlighting of projected image areas. Rather, the majority of the prior art shows accessories to provide containment or registration for superimposed transparencies. The choice to superimpose transparencies to highlight images areas suffers a range of disadvantages including complicated transparency preparation and registration devices and typically noncompact arrangements that require transparencies to be punched with holes, slits, or notches. Registration, of necessity, restricts transparency positioning, which is not always desirable. Presenters must often adjust the transparency position to compensate for obstructed visibility. Much of the prior art shows auxiliary stages, platens, frames or holders which elevate the transparency above the plane of the projection stage. Depending upon the type of overhead projector, this elevation may result in projected images distorted by double imaging.

U.S. Pat. Nos. 3,642,359 and 3,640,613 to Kitch, 3,537,792 to Furniss et al., 3,544,211 to Albee, 3,438,702 to Milhaupt et al., 3,269,261 to Porter, and 3,709,590 to Bisberg show overhead projection devices having relatively bulky and complex auxiliary projection stages or frames which elevate the transparencies above the projection plane. No means are provided for highlighting other than registering superimposed transparencies. The buildup of superimposed transparencies, when used on projectors with reflective projection stages, causes distortion. Also, these devices require special preparation of the transparencies including either carrier mountings, holes, slits, or notches for fixed registration. Further, the methods shown for registration, mounting, or containment occlude the margin areas of the transparency.

U.S. Pat. No. 4,203,659 to Constantine et al. offers an improvement over the above noted patents. Although relatively bulky, the Constantine invention allows closer proximity of the transparency to the projector's stage.

Provided in U.S. Pat. Nos. 4,732,468 to Wright and 4,787,738 to Joffe are projection stage mechanisms providing registration for superimposed transparencies. The devices shown in these patents require that holes must be punched in the margins of the transparency, thereby fixing the location of the transparency relative to the register. No method of highlighting is provided for these devices.

Also, disclosed in U.S. Pat. Nos. 3,334,540 to Wright and 3,542,463 to Klein are overhead projection accessories which lack any specific highlighting mechanisms. Wright's device occludes margins and in the preferred embodiment uses an auxiliary stage which is not compact and which elevates the transparencies. While Klein's device permits transparencies to lie flat upon the projection stage, it requires projector modification for mounting and is neither compact nor portable.

Considering the foregoing devices, what is needed most among presenters is neither unhighlighted registration or containment of transparencies, but rather a method to control audience attention that is coupled with a simple means for repeatable alignment along one axis in cooperation with a means to highlight with color borders and selected areas and points of the projected image in synchronism with the presentation. The following patents present devices that attempt, among other goals, to incorporate an element for highlighting into the mechanisms.

U.S. Pat. Nos. 3,998,535 to Clarke and 4,632,529 to Levin show accessories which provide limited alternative highlighting mechanisms. Both Clarke and Levin however, show noncompact auxiliary platforms which cause double image distortion on projectors with reflective projection stages. In Clarke the color-tinted overlay strips used to highlight specific areas are supported by planar strips along the edges of the auxiliary stage. The overlay strips for highlighting are thus elevated causing possible double image distortion. The highlighting overlays can only be oriented in either of two mutually perpendicular directions and are constrained in their shape and length to span the width of the projection stage. In Levin, the auxiliary stage includes orthogonal stop surfaces for transparency abutment to register superimposed transparencies. Levin also shows a cursor device consisting of a flexible strip or sheet attached to the top of a guide block. Since the guide block slides along the guide surface of the auxiliary stage, this highlighting mechanism is restricted to motion and position in only one axis. The cursor strip does not lie flat upon the auxiliary stage. Thus, double image distortions result with the use of projectors having reflective projection stages. The Levin device further incorporates a fixed opaque border into the auxiliary stage which occludes the transparency margins.

U.S. Pat. No. 3,832,050 to Johannsen shows a pointing device for a projection apparatus comprised of a electromechanical mechanism to move two transparent strips such that they intersect at the desired point of interest in the projected image. This device is complex and, due to its mechanical integration into the projection apparatus, is not portable. Further, the device cannot highlight borders or outline areas of the projected image.

SUMMARY OF THE INVENTION

An object of the present invention is to provide a method of presentation for overhead transparency projections that will improve audience attention and direct audience focus to projected image data in pace with the presentation.

A further object of the present invention is to furnish an accessory to highlight and align projected transparency images which is easily repositionable to color highlight image areas with a range of appropriate shapes and sizes to selectively highlight border edges, to highlight and outline image areas and to highlight image points.

An additional object of the present invention is to produce an accessory to highlight and align projected transparency images which permits the transparency to lie in direct contact with the projection stage, therefore, it may be operable without distortion on either transmissive or reflective projection stages.

Another object of the present invention is to present an accessory to highlight and align projected transparency images which utilizes unmodified transparencies to provide an alternative to the complexity of superimposed transparencies thereby reducing the attendant preparation time, cost, occluded margins, transparency modifications and registration mechanisms.

Yet another object of the present invention is to provide an accessory to highlight and align projected transparency images which does not restrict the transparency position to a single, fixed position.

Yet a further object of the present invention is to supply an accessory to highlight and align projected transparency images that is compact, compatible with the major types of overhead projectors and suitable for packaging as a portable personal presentation aid.

The subject invention, a highlighting device for use on a stage surface of an overhead projector, comprises a color tinted light transmissive body with upper and lower surfaces. The subject device may serve as a register for aligning and emphasizing an information transparency sheet or as an emphasis tool that lays on or near an information transparency sheet. To aid the user in positioning the device a handle may be affixed to the body. Additionally, support elements or feet may be affixed to the body to aid in seating the device on the stage surface. Typically, a user would align the edge of an information transparency sheet against one border of the subject invention body, or support element, that is positioned in a suitable location on a stage surface. Either a lower surface of a body or a support element has a stage surface contact area that has a suitably high coefficient of friction so as to prevent the highlighting device from sliding when an information transparency sheet is aligned against it. The color tint of the body aids in focusing audience attention.

Further, other highlighting devices, according to the subject invention, may be laid on or near an information transparency sheet or sheets to stress another border or a particular area or point. These additional highlighting devices have bodies of variable border outline. Such outlines have regular or irregular borders and are appropriately matched to the transparency area or point to be highlighted. Another such outline has an outer edge and an inner edge created by cutouts or inserts within a body.

Other objects, advantages, and novel features of the present invention will become apparent from the detailed description that follows, when considered in conjunction with the associated drawings.

DESCRIPTION OF THE PREFERRED EMBODIMENT

For overhead projections, audience attention and response is increased when a colored highlighting device of the subject invention is teamed with an information transparency sheet. The subject invention produces substantially distortion free color highlighting. Additional emphasis of a projected image is achieved when a plurality of highlighting devices cooperate to accent one or more regions of such a transparency sheet. An information transparency sheet need not be modified for use with this invention and no restrictions exist as to positioning a transparency sheet for projection.

The subject invention provides a means for repeatably aligning a transparency sheet while highlighting a border of the sheet without occluding part of the transparency border. These alignment and edge emphasis features of the present invention eliminate major sources of audience distraction. Further, the subject device may be used to highlight selected areas of the projected image to direct, focus, and pace audience attention. Also, the subject invention may serve as a pointing means to indicate fine detail on a projected image. This pointing capacity facilitates the presenter's ability to target points of discussion. Additionally, the use of color to selectively highlight monochrome or color image areas provides major benefits in enhanced visual interest. Presenters desire and need simple highlighting devices that are compact and portable across a range of overhead projection equipment.

Figure 1:
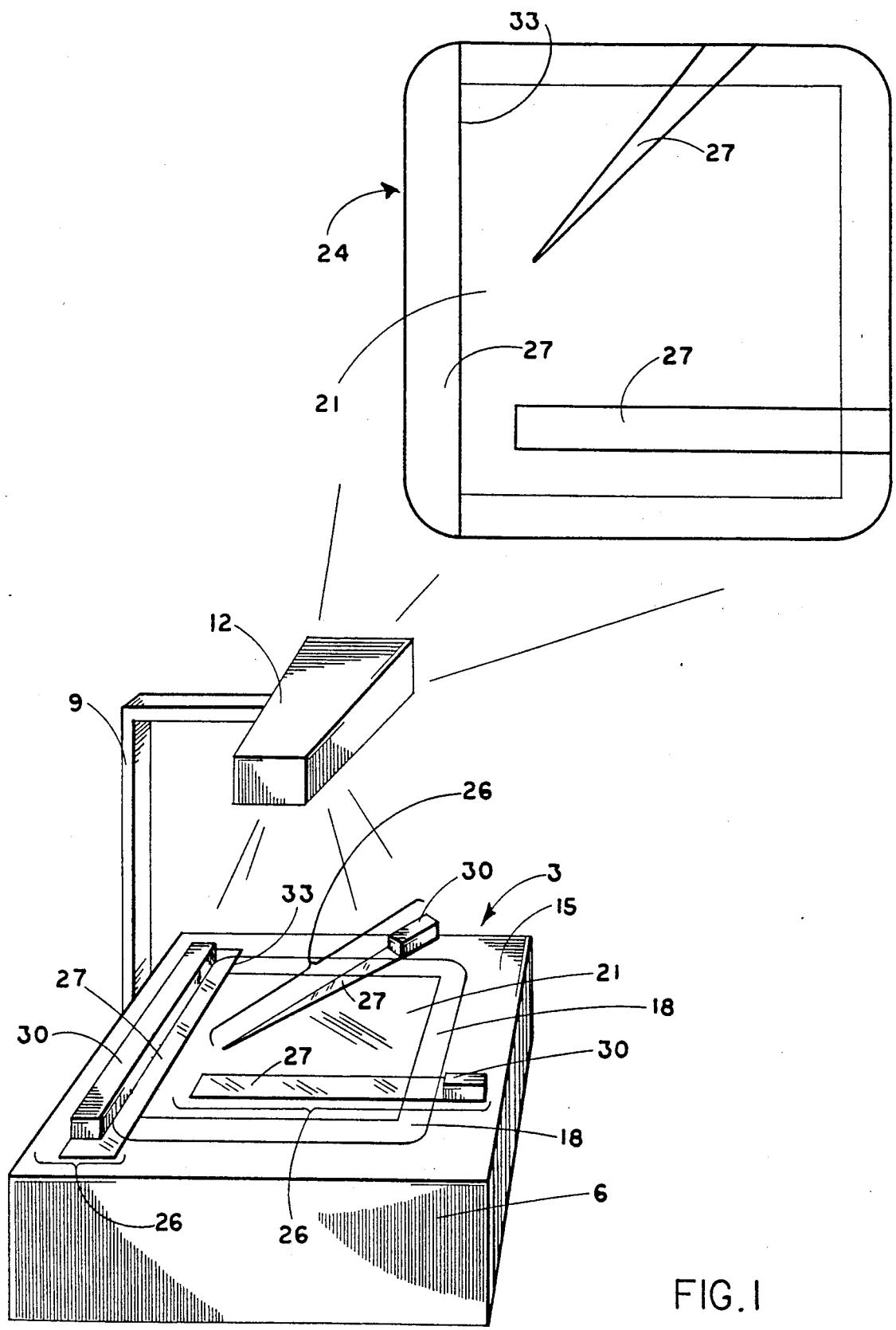
FIG. 1 is a perspective view of the subject invention showing three embodiments placed upon a projector stage and the resultant composite projection on a viewing surface or screen.

Referring now to FIGS. 1-5, there is shown a preferred embodiment of the subject highlighting device. In particular, FIG. 1 illustrates the use of the subject invention highlighting device with a typical overhead projector 3. A generalized overhead projector comprises various elements, but of importance here are the projector base 6, supporting arm 9, projector head 12, stage 15, and either a light transmitting glass or light focusing reflective mirror or lens 18. To clarify the difference between a light transmitting glass and a mirror and to underscore a major benefit of the subject invention, two basic constructions for overhead projectors must be considered. Traditional overhead projector construction positions the light source and cooling fan beneath a light transmissive projection stage. A more current and increasingly more popular construction positions the light source or head above a focusing, mirrored, reflective projection stage. The reflective stage construction is widely used since its light source arrangement eliminates the cooling fan yielding noiseless operation as well as affording a more compact projector. In projectors with focusing reflective projection stages, the light passes through the transparency media or information transparency sheet twice, first from above and then a second time from beneath the sheet as the light is focused and reflected from the mirrored surface of the projection stage. As the transparency sheet is elevated above the plane of the reflective projection stage, a double image distortion is generated which increases with distance. Any technique for elevating the transparencies above the projection stage, including even a buildup of superimposed transparency sheets, will cause this double image distortion. Since a transparency is placed directly on a projector's stage and is not elevated, the subject invention minimizes distortion problems, particularly when using a reflective projector. In the past, multiple layers of transparencies were often employed for emphasis. With the subject invention, satisfactory emphasis is achieved by use of a highlighting device itself without the need of additional overlaying transparencies, although layered transparencies may still be appropriate for multiple informational images.

To describe the construction and functioning of the subject invention, further details concerning the projection stage 15 are required. Within the surface of the stage 15 is either a light transmissive glass 18 or focusing mirror 18, depending upon the nature of the projector, articulated immediately above. However, it must be stressed again that the subject invention functions well with either projector construction. The glass or mirror 18 serves as a supporting surface for an information transparency sheet 21. This sheet 21 is usually of a light transmissive plastic material and is well known to those skilled in the appropriate art. Similarly, imprinting such a sheet 21 with words, pictures, and the like is a well known process. Typically, for transmitting the information on a sheet 21 to an audience, the image of a sheet 21 is projected upon a screen or other viewing surface 24, however, equivalent procedures are contemplated to be within the realm of this disclosure.

Without additional time, effort, and money, most transparency sheets 21 are monochrome. For effective communication of the material (charts, outlines, graphs, drawings, and the like) an interested and possibly excited, or at least focused, audience is desirable. By adding color emphasis the subject invention enlivens a monochrome projection and allows the user to highlight sheet 21 regions such as border edges, specific areas, and points. FIGS. 1-5 illustrate three embodiment variations of the subject invention 26 that serve to stress edges, areas, and points. The highlighter or highlighting device 26 comprises a rigid or flexible color tinted (with one or more colors) light transmissive body 27 having an upper surface 28 and a lower surface 29. To prevent distortion of projected light (in particular reflected light), surfaces 28 and 29 are usually substantially parallel, however, non-parallel surfaces may serve as a possible emphasis tool or lens like device and are within the domain of this disclosure. Further, although the body 27 usually has a generally flattened form (a thickness usually less than about one-half inch, more usually less than about one-quarter inch, and preferably about one-sixteenth to about one-quarter inch) to minimize possible distortions produced by reflective projectors, a thicker rigid or flexible body 27 may be employed. For emphasizing an information transparency sheet 21, this body my be laid next to or on a sheet 21 and positioned to accentuate a border edge, area, or point.

The body 27 may be fabricated from color tinted light transmissive materials such as glass and plastic, preferably plastic. Amplified highlighting is achieved with fluorescent color tinting that tends to glow during projection. Also, a means for additional emphasis may be incorporated in or on the body 27 including markings (lines, writings, and the like), cutouts or openings in the body 27 to pass unaltered light, inserts of color tinted materials into the body 27, color tinted forms layered onto the body 27, and equivalent strategies.

Preferably, the highlighting device 26 has a means for positioning the body 27 on or near a transparency sheet 21. This means for positioning is usually a handle 30 attached to the body 27. Alhtough the handle 30 is preferably fastened to the upper surface 28 of the body 27 other locations of attachment are also suitable. Generally the handle 30 and body 27 are secured to one another by an appropriate glue or by heat, however, the two may be formed as one unit by molding, pouring, extruding, or similar process. Normally the handle 30 is opaque, however, a color tinted and light transmissive handle 30 is contemplated as an additional emphasis element of the subject device. The handle 30 may project directly above the body 27, as shown in FIGS. 1-5, or may be adapted to project away from the body 27 and be of any appropriate shape and includes additional aids for grasping such as ridges, indentation, non-slip areas, and the like. Further, once the highlighting deivce is positioned on or near the transparency sheet 21 a means such as a mechanical or electronic release, Velcro ®, or the like may be present for releasing the handle 30 from the body 27. Likewise, these means may be employed to retrieve the body 27.

Figure 2:
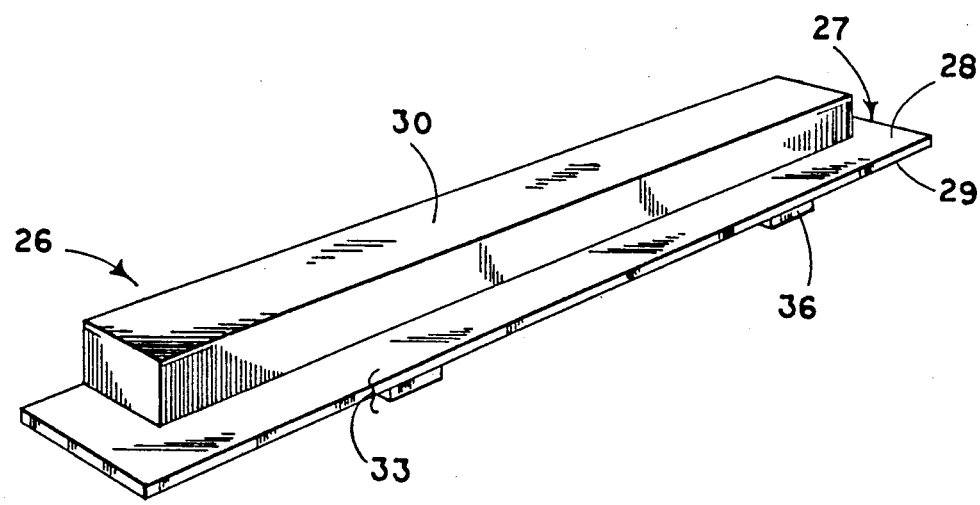
FIG. 2 is a perspective view of a preferred embodiment of the subject invention normally used as a register/border highlighter.
Figure 3A:
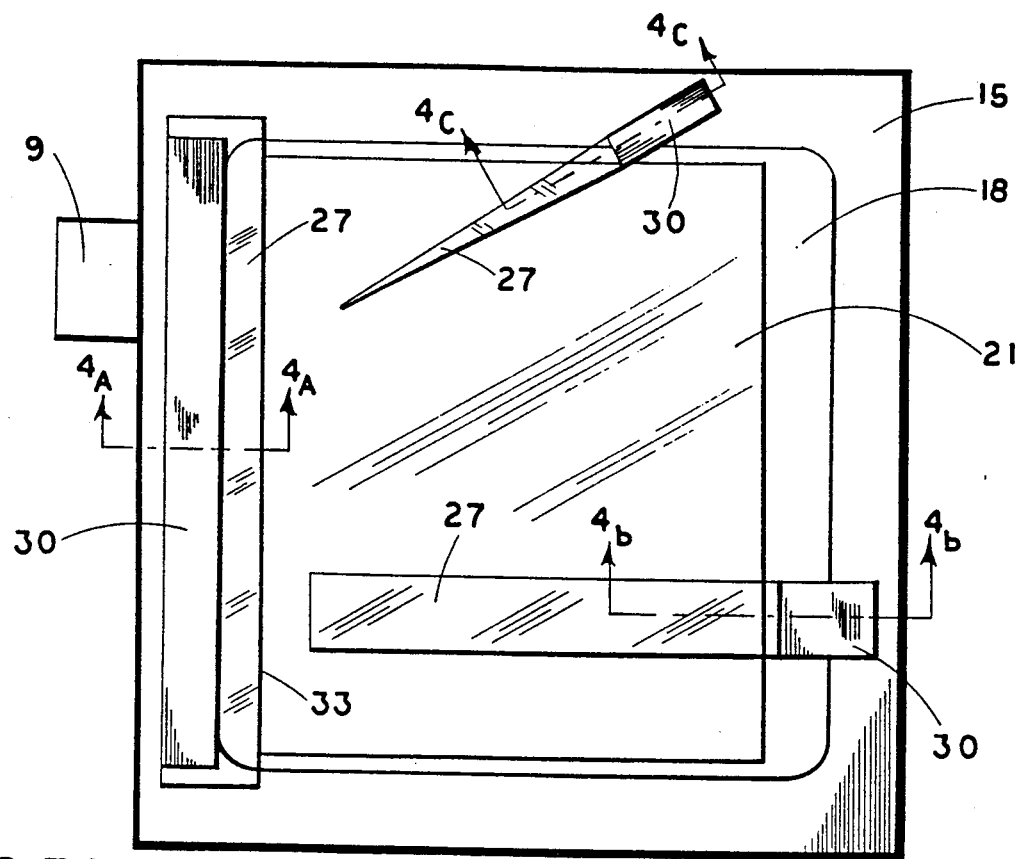
FIG. 3a is a portrait top view of a projection stage with three embodiments of the subject invention highlighting a transparency sheet.
Figure 3B:
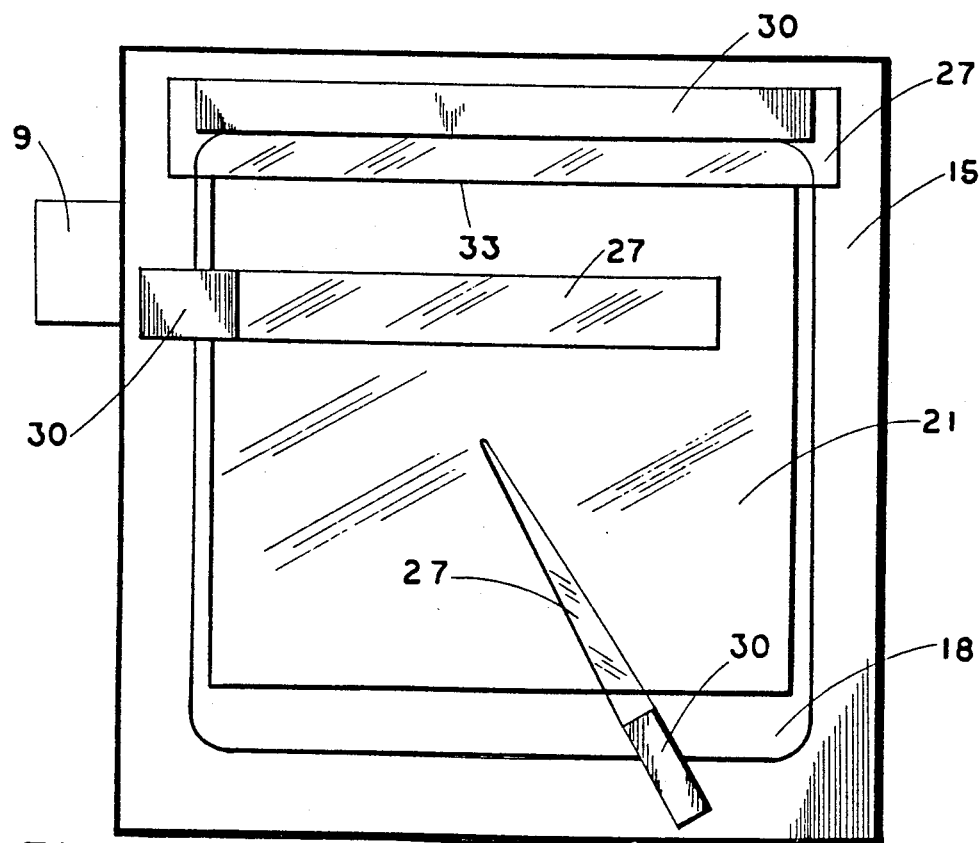
FIG. 3b is a landscape top view of a projection stage with three embodiments of the subject invention highlighting a transparency sheet.

The body 27, either with or without a handle 30, is used to highlight regions of an information transparency sheet 21. One aligning and highlighting technique is to place the highlighting device along one side of the stage 15 to produce an alignment register or generally straight edge 33 for abutting an edge of a sheet 21. FIG. 2 illustrates a highlighter embodiment that may be used as a register. One of the three embodiments shown in FIGS. 3a and 3b (FIG. 3a illustrates a portrait alignment on the stage 15 and FIG. 3b shows a landscape alignment) illustrates the subject invention employed as a register laid along the left, FIG. 3a, and top, FIG. 3b, sides of a stage 15, however, these orientations are for illustrative purposes only and an alignment is possible from any direction on the stage 15. Further, since the color tinted body 27 of the highlighter device is light transmissive, the border edge of the sheet 21 is emphasized with color. Another highlighting technique for emphasizing an area or point is to place the highlighting device directly upon the sheet 21 so that the body's lower surface 29 directly contacts the sheet 21.

The outline or border of the body 27 may be any desired and appropriate shape. FIGS. 1, 2, 3, and 5 show two general body 27 shapes. A rectangular body 27 outline is handy for use as a register and border edge highlighter(register/border highlighter) or for emphasizing a particular area (area highlighter). A pointer is useful for stressing a particular small region or point (pointer highlighter). Other regular or irregular shapes such as triangles, squares, circles, elipses, and the like are disclosed and claimed and these include shapes with cutout sections or inserts to produce a suitable border outline to draw audience attention to a specific area or point on a sheet 21.

Normally when the highlighting device 26 is employed as both an alignment tool and as a border edge highlighter, a support element 36 may be secured to the body 27, usually, not critically, via the lower surface 29. For registering and emphasizing regions of a sheet 21 other than a border edge, support elements 36 are not generally secured to the body 27, but attachment of such support elements 36 may be employed without diminishing the usefulness of the highlighting device. Although the support element 36 may be a single member, more normally, as shown in FIG. 2, a plurality of support elements 36 are employed as feet. To serve as a register for aligning a transparency sheet 21, the highlighting device should contact the stage 15 with a sufficiently high coefficient of friction between the device and stage 15 to prevent movement or skidding of the device on the stage 15. When one or more support elements 36 are incorporated into the highlighting device 26, these support elements 26 would be fabricated of material such as pliable rubber, elastomeric polymer, or the equivalent so long as a suitable coefficient of friction is generated to prevent slippage during alignment and use.

The support element 36 may be attached to the body 27 by gluing, heating, or similar methods well known in the art, Additionally, the highlighting device 26, including the support elements 36, may be formed as one unit by molding, pouring, extruding, or similar technique. The support elements 36 are preferably light transmissive and may be colorless or color tinted and of any appropriate regular or irregular cross-sectional area (parallel to the body surfaces 28 and 29) such as semicircle, square, round, triangular, or the like. A particularly useful number of feet or support elements 36 is three, with two proximate the generally straight edge employed for the embodiment used as a register, see FIG. 2, and one proximate the opposing edge. This distribution allows the device to sit evenly on an irregular stage 15 surface. In addition to or as a substitute for the body 27 itself, the support elements 36 may serve as alignment registers for an abutted sheet 21. Although the thickness of a support element 36 may be one-half inch or more, the thickness is usually about one-sixty forth inch to about one-quarter inch, more usually about one-thirty second inch to about one-eighth inch, and preferably about one-sixteeth inch to about one-eighth inch.

Focusing an audience's attention upon a selected area, portion, domain, region, or point of an information transparency sheet 21, produced by an overhead projection on a viewing surface 24, is usually achieved by setting on or near a sheet 21 placed upon an overhead projection stage 15 at least one highlighting device. Depending upon the position of each device, relative to the sheet 21, an edge, area, or point may be emphasized. Typically, to stress multiple regions of a transparency sheet 21 to an audience for additional clarity or perhaps dramatic effect, a user of the subject invention might employ, in concert, a plurality of highlighting devices either simultaneously or sequentially. Such usage is illustrated in FIGS. 1, 3a, and 3b.

Normally, a user will initiate the highlighting process by placing a first hightlighting device having at least one generally straight edge 33 upon a stage 15 to create an alignment register and to cast a substantially distortion free image (since the highlighting device is proximate the stage surface) for emphasizing a border or the sheet 21. Since the subject invention is versatile as to stage positioning, a first highlighting device may serve as a register for aligning a sheet 21 from a stage's sides, top, bottom (see FIG. 3a for a left side, portrait, alignment and FIG. 3b for a top, landscape, alignment or registration), or at any angle between the vertical and horizontal. The first highlighting device 26 is customarily fitted with support elements 36, but a device with just a body 27 is equally acceptable and may include a means for positioning 30.

After the first highlighting device 26 is placed upon the stage 15 a second highlighting device may be laid on or near the transparency sheet 21 to draw audience attention to a specific area or point of the projected image. A first or second highlighting device may have any suitable border outline such as rectangular, circular, pointed and the like, and as indicated above, include additional emphasis means such as markings, cutouts to allow non-tinted, unaltered light to pass to the viewing surface, or inserts of different color tinted materials. Since a second highlighting device is not usually employed as a register (although this is contemplated as an optional procedure, at the discretion of the user, for such a procedure as aligning additional, overlaying transparency sheets), support elements 36 are not necessary, therefore, a normal configuration for a second highlighting device would be a body 27 and an optional handle 30.

Further highlighting for emphasizing additional areas or points may be achieved by laying additional second highlighting devices on or near the sheet 21. As noted above above, the shapes of these second highlighting devices may be of unlimited design to suit a user's fancy and strategic goals.

Figure 4A:
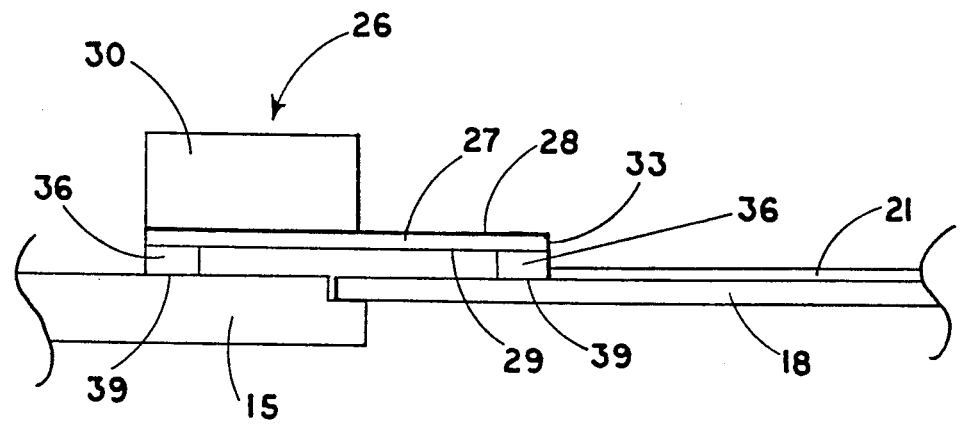
FIG. 4a is a fragmentary cross-sectional view of a first embodiment (register/border highlighter) of the subject invention taken on line 4a—4a of FIG. 3a and showing an underlying transparency sheet with the projector stage.
Figure 4B:
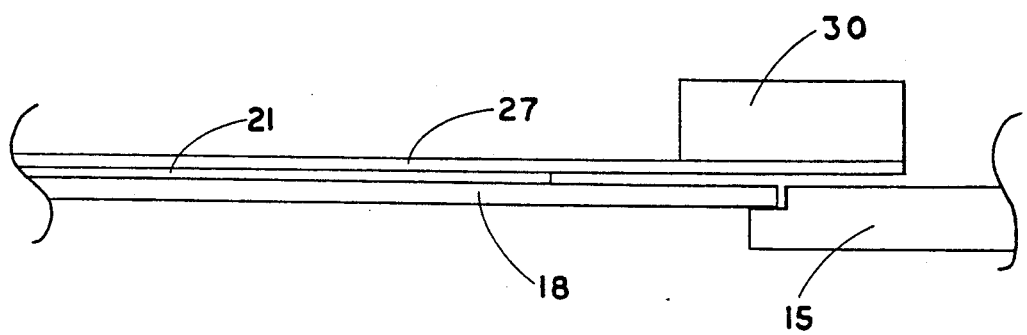
FIG. 4b is a fragmentary cross-sectional view of a second embodiment (area highlighter) of the subject invention taken on line 4b—4b of FIG. 3a and showing an underlying transparency sheet with the projector stage.
Figure 4C:
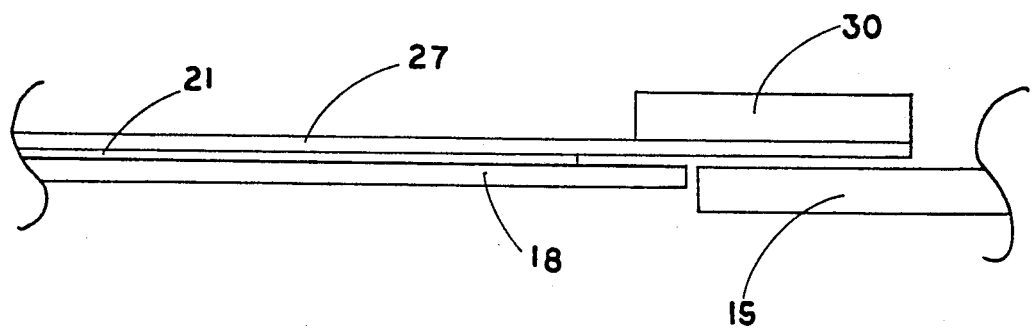
FIG. 4c is a fragmentary cross-sectional view of a third embodiment (pointer highlighter) of the subject invention taken on line 4c—4c of FIG. 3a and showing an underlying transparency sheet with the projector stage.

Specifically, FIGS. 1, 3a, and 3b illustrate three forms of the subject invention. A first highlighting device that serves as a register/border highlighter is shown in fragmentary cross-section in FIG. 4a, as derived from FIG. 3a. As depicted, the device 26 sets upon a stage 15 so that a sheet 21 abuts against its generally straight edge 33 for a simple reproducible registration. FIG. 4b, also derived from FIG. 3a, shows a fragmentary cross-section of a device for highlighting an area of a transparency sheet 21 that is configured with a handle 30 near one end of a rectangular body 27 and no support elements (area highlighter). FIG. 4c, another view derived from FIG. 3a, presents a highlighter for emphasizing a point (pointer highlighter) on a transparency 21 that comprises a handle 30 fastened to one end of a pointer (a flattened form having an elongated triangular end and a rectangular end) shaped body 27. As seen in FIGS. 4b and 4c, when a highlighter is not employed as a register it may be laid directly or partially on a sheet 21 and may be positioned easily by the user. As mentioned, other outline borders are equally suitable and may be desirable to highlight specific sections of a transparency 21.

Figure 5:
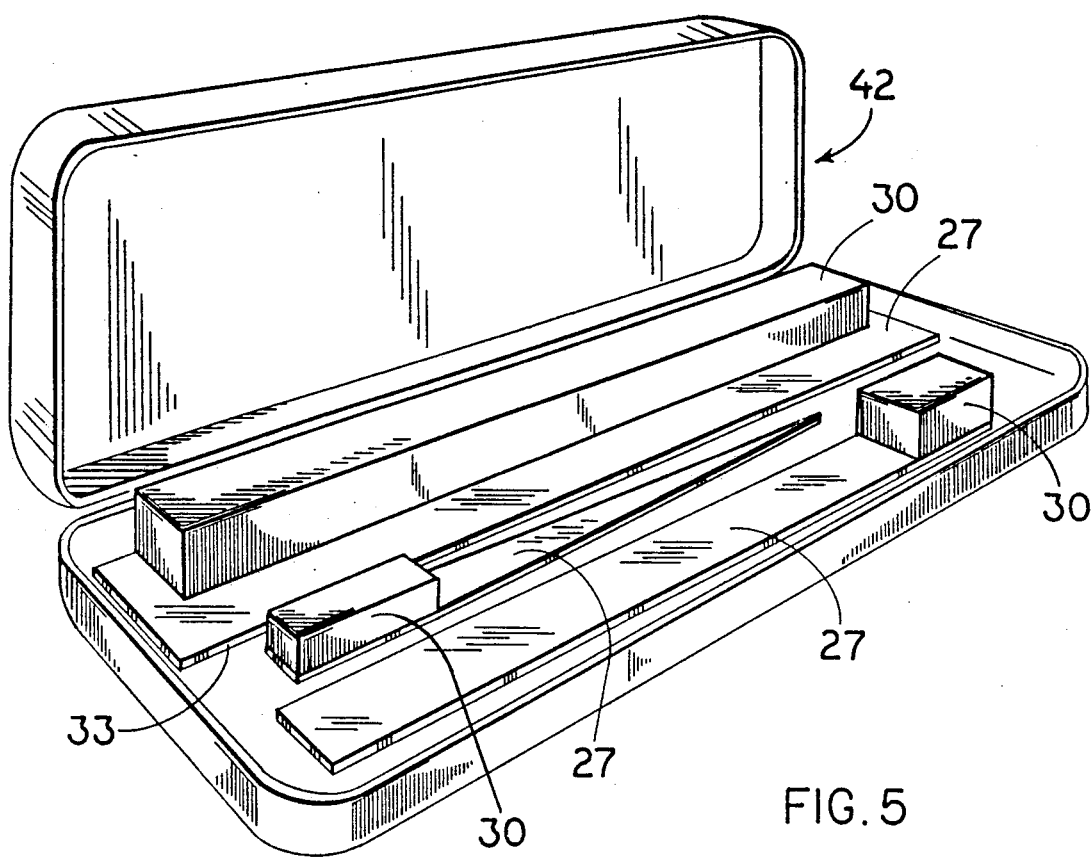
FIG. 5 is a perspective view of a typical kit containing three embodiments of the subject invention.

To facilitate the easy use of the subject invention, a kit 42 containing a plurality of highlighting devices is dislosed and illustrated in FIG. 5. Although three highlighting devices with specific body 27 shapes and handle 30 arrangements are shown in the FIG. 5 kit 42 (a register/border edge highlighter with an handle 30 extending over a majority of the body's 27 length, an area highlighter with an handle 30 located near one end of the body 27, and a pointer highlighter), any number of highlighting units may be packaged in the kit 42 and shaped with bodies of suitable form, including the means for additional emphasis noted above.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A highlighting device for use on a stage surface of an overhead projector comprising a color tinted light transmissive body with upper and lower surfaces, wherein said body lies directly on or next to an information transparency sheet placed upon said stage surface and said body casts a substantially distortion free image upon a viewing surface to highlight said information transparency sheet, further comprising a plurality of support elements affixed to said lower body surface for supporting said body on said stage surface, wherein each of said support elements provides a sufficiently high coefficient of friction between said stage surface and said highlighting device so as to prevent movement of said highlighting device when at least two of said support elements are employed as a register for aligning and emphasizing an edge of said information transparency sheet.

2. An highlighting device according to claim 1, wherein said support elements total three, whereby two of said support elements are proximate an edge of said body used for said aligning and the third of said support elements is proximate an edge of said body opposite said aligning edge.

3. A highlighting device for use on a stage surface of an overhead projector, comprising:
    (a) a color tinted light transmissive body with upper and lower surfaces, wherein said body lies directly on or next to an information transparency sheet placed upon said stage surface and said body casts a substantially distortion free image upon a viewing surface to highlight said information transparency sheet and
    (b) means for positioning said body on said stage surface, wherein said means are associated with said upper surface, further comprising a plurality of support elements affixed to said lower body surface for supporting said body on said stage surface, wherein each of said support elements provides a sufficiently high coefficient of friction between said stage surface and said highlighting device so as to prevent movement of said highlighting device when at least two of said support elements are employed as a register for aligning and emphasizing an edge of said information transparency sheet.

4. A method of focusing audience attention on a selected portion of an information transparency sheet positioned on a stage of an overhead projector and viewed on a viewing surface, comprising the steps of:
    (a) placing on said stage surface a first highlighting device that serves as a register for aligning and emphasizing an edge of said information transparency sheet comprising a color tinted light transmissive body with upper and lower surfaces and at least one generally straight edge, wherein said body cast a substantially distortion free image upon said viewing surface;
    (b) aligning an edge of said information transparency sheet against said generally straight edge of said first highlighting device; and
    (c) laying on or near said information transparency sheet a second highlighting device comprising a color tinted light transmissive body with upper and lower surfaces and a generally flattened form having a suitable border outline to draw audience attention to a specific area or point of said information transparency sheet.

5. A method of focusing audience attention according to claim 4, further comprising the step of laying additional said second highlighting devices on or near said information transparency sheet to aid in emphasizing additional areas or points on said information transparency sheet.

6. A method of focusing audience attention according to claim 5, wherein said first and second highlighting devices further comprise means for positioning said body, wherein said means are associated with said body upper surface.

7. A method of focusing audience attention according to claim 6, wherein said positioning means is an handle affixed to said body upper surface.

8. A method of focusing audience attention according to claim 6, wherein said first highlighting device further comprises a plurality of support elements affixed to said lower body surface for supporting said body on said stage surface, wherein each of said support elements provides a sufficiently high coefficient of friction between said stage surface and said first highlighting device so as to prevent movement of said highlighting device when at least two of said support elements are employed as a register for aligning and emphasizing an edge of said information transparency sheet.

* * * * *